(12) United States Patent
Yoshitomi

(10) Patent No.: US 11,495,811 B2
(45) Date of Patent: Nov. 8, 2022

(54) FUEL CELL SYSTEM AND GAS LIQUID SEPARATOR

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 16/794,292

(22) Filed: Feb. 19, 2020

(65) Prior Publication Data

US 2020/0274179 A1 Aug. 27, 2020

(30) Foreign Application Priority Data

Feb. 22, 2019 (JP) .............................. JP2019-030193

(51) Int. Cl.
| | |
|---|---|
| *H01M 8/0662* | (2016.01) |
| *B01D 45/08* | (2006.01) |
| *H01M 8/04119* | (2016.01) |
| *H01M 8/04082* | (2016.01) |

(52) U.S. Cl.
CPC .......... *H01M 8/0687* (2013.01); *B01D 45/08* (2013.01); *H01M 8/04156* (2013.01); *H01M 8/04201* (2013.01)

(58) Field of Classification Search
None
See application file for complete search history.

(56) References Cited

U.S. PATENT DOCUMENTS

| | | | |
|---|---|---|---|
| 2010/0190068 A1* | 7/2010 | Miyajima | H01M 8/02 429/413 |
| 2018/0123148 A1 | 5/2018 | Itoga | |
| 2018/0375123 A1 | 12/2018 | Okamura et al. | |

FOREIGN PATENT DOCUMENTS

| | | |
|---|---|---|
| JP | 2010-135082 | 6/2010 |
| JP | 2018-073564 | 5/2018 |
| JP | 2019-005690 | 1/2019 |

OTHER PUBLICATIONS

Japanese Office Action for Japanese Patent Application No. 2019-030193 dated Dec. 1, 2020.

* cited by examiner

*Primary Examiner* — Haroon S. Sheikh
(74) *Attorney, Agent, or Firm* — Amin, Turocy & Watson, LLP

(57) ABSTRACT

A fuel cell system includes an inlet pipe configured to guide a fuel gas injected from an injector to a fuel cell stack, and a gas liquid separator configured to perform gas liquid separation of a fuel exhaust gas discharged from the fuel cell stack. The gas liquid separator is directly coupled to a lower portion of the inlet pipe. A connection channel configured to connect the inside of the gas liquid separator and a channel in the inlet pipe together is formed in a part coupling the gas liquid separator and the inlet pipe together.

9 Claims, 5 Drawing Sheets

FUEL CELL SYSTEM AND GAS LIQUID SEPARATOR

CROSS-REFERENCE TO RELATED APPLICATION

This application is based upon and claims the benefit of priority from Japanese Patent Application No. 2019-030193 filed on Feb. 22, 2019, the contents of which are incorporated herein by reference.

BACKGROUND OF THE INVENTION

Field of the Invention

The present invention relates to a fuel cell system and a gas liquid separator.

Description of the Related Art

For example, Japanese Laid-Open Patent Publication No. 2018-073564 discloses a fuel cell system including an inlet pipe for guiding a fuel gas injected from an injector to a fuel cell stack, and a gas liquid separator for performing gas liquid separation of a fuel exhaust gas discharged from the fuel cell stack. The inlet pipe is coupled to a circulation pipe for circulating the fuel exhaust gas in the gas liquid separator to the inlet pipe.

SUMMARY OF THE INVENTION

In the above described fuel cell system, since the inlet pipe and the gas liquid separator are coupled together by the circulation pipe, the number of component parts in the fuel cell system is large, and the fuel cell system has a large size disadvantageously.

The present invention has been made taking such a problem in to account, and an object of the present invention is to provide a fuel cell system and a gas liquid separator which make it possible to reduce the number of component parts, and achieve size reduction.

According to an embodiment of the present invention, a fuel cell system is provided. The fuel cell system includes an inlet pipe configured to guide a fuel gas injected from an injector to a fuel cell stack, and a gas liquid separator configured to perform gas liquid separation in a fuel exhaust gas discharged from the fuel cell stack. The gas liquid separator is directly coupled to a lower portion of the inlet pipe, and a connection channel connecting an interior of the gas liquid separator and a channel in the inlet pipe together is formed in a part coupling the gas liquid separator and the inlet pipe together.

According to another aspect of the present invention, a gas liquid separator is provided. The gas liquid separator mounted in a fuel cell system in which a fuel gas injected from an injector to a channel in an inlet pipe is guided to a fuel cell stack. The gas liquid separator is configured to perform gas liquid separation of the fuel gas discharged from the fuel cell stack. The fuel cell stack includes a fuel gas supply passage configured to guide a fuel gas to each of a plurality of power generation cells that are stacked together, and a first fuel gas discharge passage and a second fuel gas discharge passage configured to discharge a fuel exhaust gas discharged from the plurality of power generation cells, respectively. The gas liquid separator includes a base part having a gas liquid separation chamber, and a coupling part provided above the base part, and directly coupled to a lower portion of the inlet pipe. The base part includes a first inlet port configured to guide the fuel exhaust gas discharged from the first fuel gas discharge passage into the base part, and a second inlet port configured to guide the fuel exhaust gas discharged from the second fuel gas discharge passage into the base part.

In the present invention, since the gas liquid separator is directly coupled to the lower side of the inlet pipe, the circulation channel connecting the gas liquid separator and the inlet pipe is not required. Accordingly, it is possible to reduce the number of component parts, and achieve size reduction.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell system and a gas liquid separator according to the present invention will be described with reference to the accompanying drawings.

Figure 1:
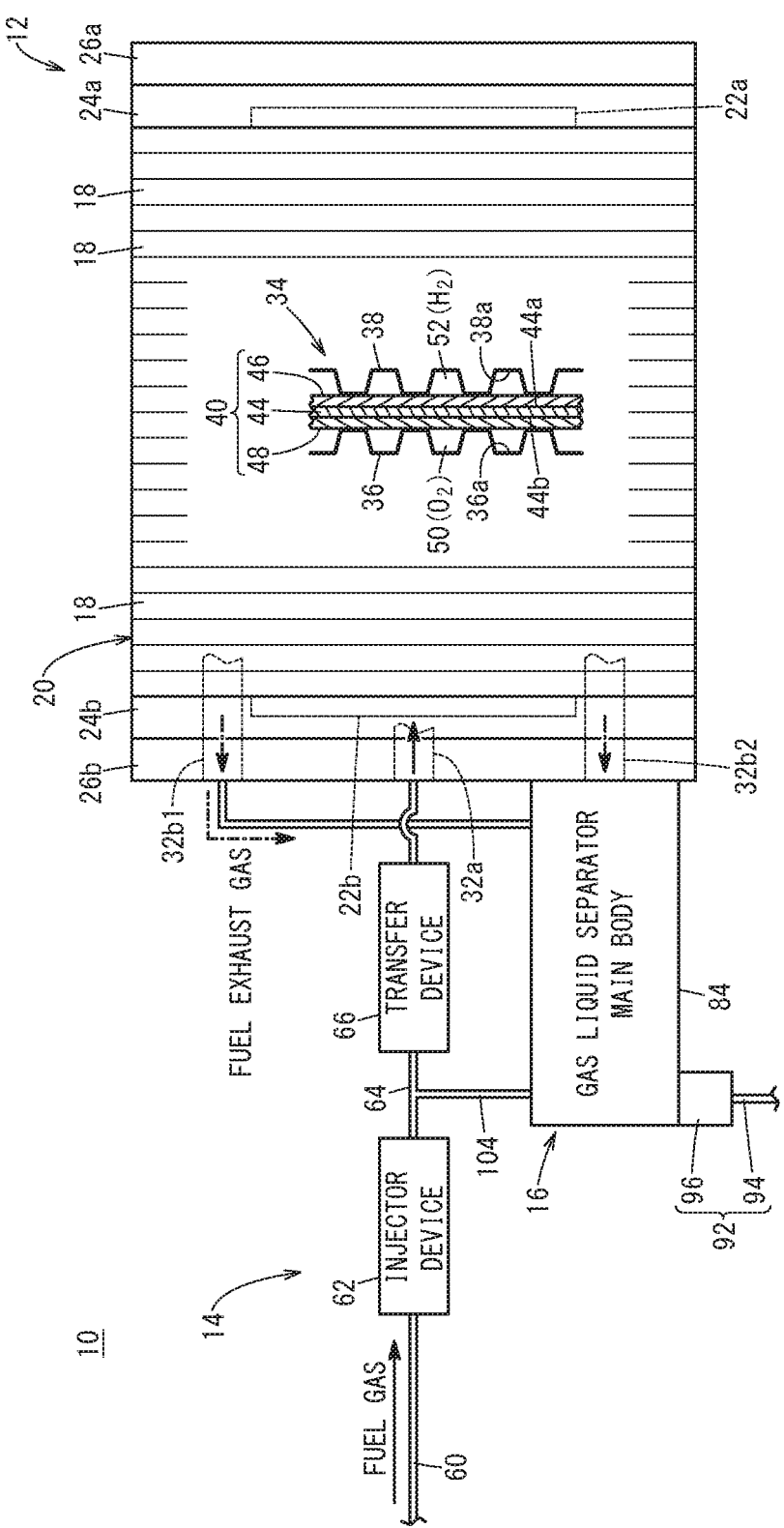
FIG. 1 is a diagram schematically showing structure of a fuel cell system according to an embodiment of the present invention.

For example, a fuel cell system 10 shown in FIG. 1 is mounted in a fuel cell electrical automobile (not shown). It should be noted that the fuel cell system 10 may be used in stationary applications as well.

As shown in FIG. 1, the fuel cell system 10 includes a fuel cell stack 12, a fuel gas supply apparatus 14 for supplying a fuel gas, and a gas liquid separator 16 for performing gas liquid separation of a fuel exhaust gas discharged from the fuel cell stack 12. It should be noted that the fuel cell system 10 includes an oxygen-containing gas supply apparatus (not shown) for supplying an oxygen-containing gas and a coolant supply apparatus (not shown) for supplying a coolant.

Figure 2:
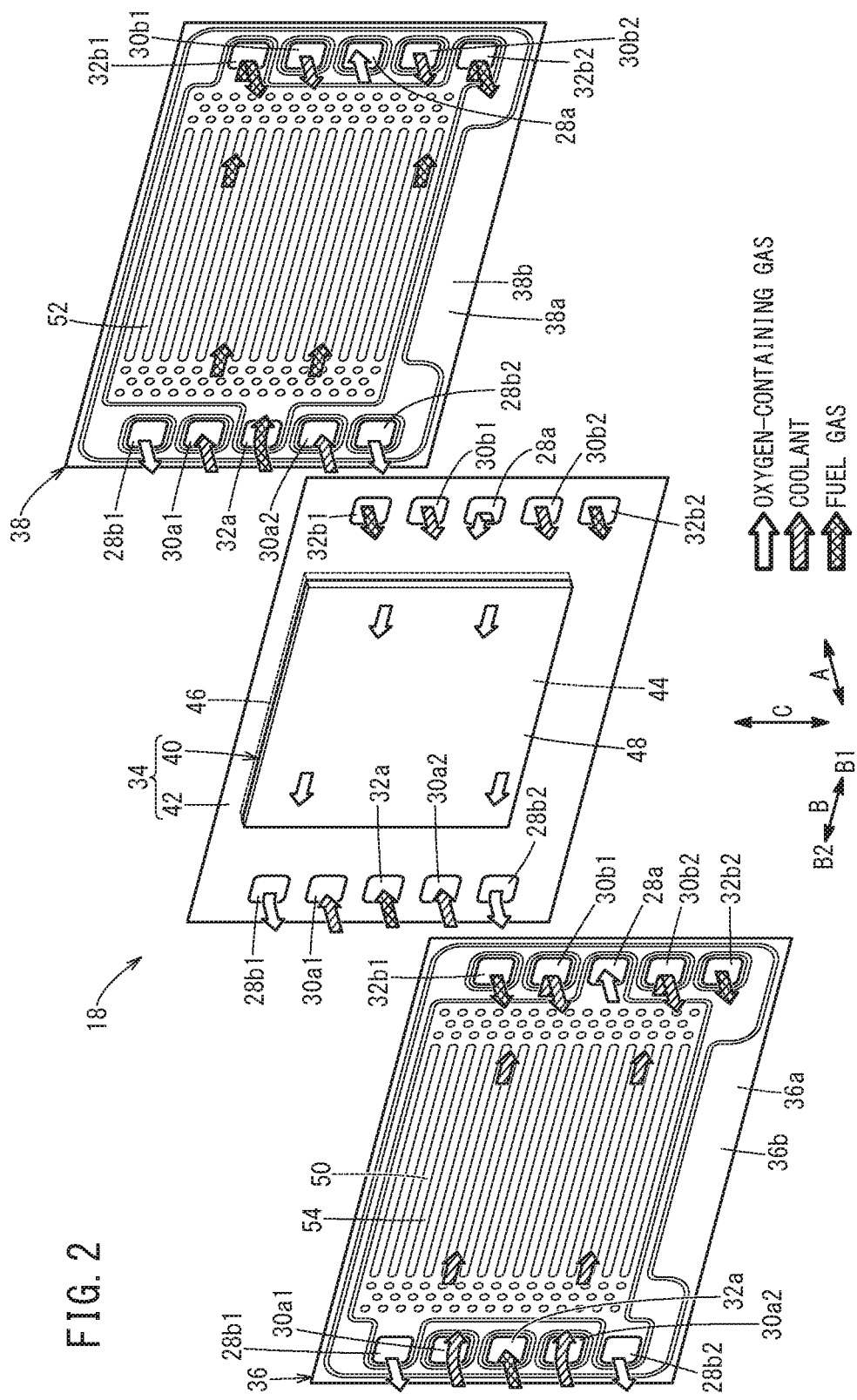
FIG. 2 is an exploded perspective view showing a power generation cell.

The fuel cell stack 12 includes a cell stack body 20 formed by stacking a plurality of power generation cells 18 in a horizontal direction (indicated by an arrow A in FIG. 2). At one end of the cell stack body 20 in a stacking direction, a terminal plate 22a is provided. An insulator 24a is provided outside the terminal plate 22a, and an end plate 26a is provided outside the insulator 24a. At the other end of the cell stack body 20 in the stacking direction, a terminal plate 22b is provided. An insulator 24b is provided outside the terminal plate 22b, and an end plate 26b is provided outside the insulator 24b. The insulators 24a, 24b are insulating plates for electrically insulating the terminal plates 22a, 22b and the end plates 26a, 26b.

As shown in FIG. 2, at one end of each of the power generation cells 18 in a long side direction (end in a direction indicated by an arrow B1), a first fuel gas discharge passage 32$b$1, a first coolant discharge passage 30$b$1, an oxygen-containing gas supply passage 28$a$, a second coolant discharge passage 30$b$2, and a second fuel gas discharge passage 32$b$2 are arranged in this order, from upper to lower positions.

At the other end of each of the power generation cells 18 in the long side direction (end in a direction indicated by an arrow B2), a first oxygen-containing gas discharge passage 28$b$1, a first coolant supply passage 30$a$1, a fuel gas supply passage 32$a$, a second coolant supply passage 30$a$2, and a second oxygen-containing gas discharge passage 28$b$2 are arranged in this order, from upper to lower positions.

The oxygen-containing gas is supplied through the oxygen-containing gas supply passage 28$a$. The oxygen-containing gas is discharged through each of the first oxygen-containing gas discharge passage 28$b$1 and the second oxygen-containing gas discharge passage 28$b$2.

A coolant such as pure water, ethylene glycol, or oil is supplied through each of the first coolant supply passage 30$a$1 and the second coolant supply passage 30$a$2. The coolant is discharged through each of the first coolant discharge passage 30$b$1 and the second coolant discharge passage 30$b$2.

A fuel gas such as a hydrogen-containing gas is supplied through the fuel gas supply passage 32$a$. The fuel gas (fuel exhaust gas) is discharged through each of the first fuel gas discharge passage 32$b$1 and the second fuel gas discharge passage 32$b$2.

Figure 3:
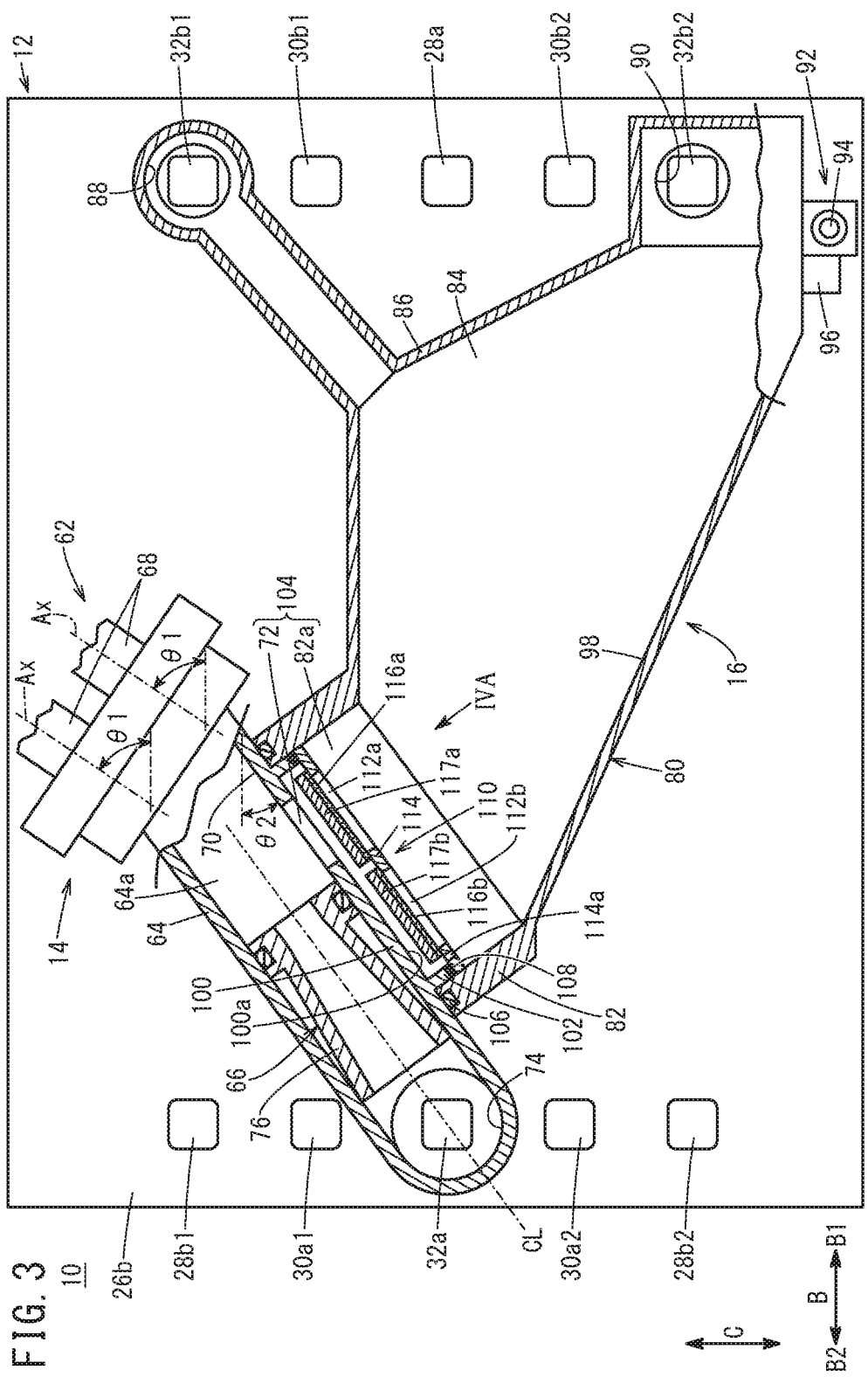
FIG. 3 is a partial cross sectional plan view showing a fuel cell stack, a fuel gas supply apparatus, and a gas liquid separator.

Each of the oxygen-containing gas supply passage 28$a$, the first oxygen-containing gas discharge passage 28$b$1, the second oxygen-containing gas discharge passage 28$b$2, the first coolant supply passage 30$a$1, the second coolant supply passage 30$a$2, the first coolant discharge passage 30$b$1, the second coolant discharge passage 30$b$2, the fuel gas supply passage 32$a$, the first fuel gas discharge passage 32$b$1, and the second fuel gas discharge passage 32$b$2 extends through the cell stack body 20, the insulator 24$b$, and the end plate 26$b$ (see FIGS. 1 to 3).

Stated otherwise, as shown in FIG. 3, at one end of the end plate 26$b$ in the long side direction (end in the direction indicated by the arrow B1), the first fuel gas discharge passage 32$b$1, the first coolant discharge passage 30$b$1, the oxygen-containing gas supply passage 28$a$, the second coolant discharge passage 30$b$2, and the second fuel gas discharge passage 32$b$2 are arranged from upper to lower positions in this order.

At the other end of the end plate 26$b$ in the long side direction (end in the direction indicated by the arrow B2), the first oxygen-containing gas discharge passage 28$b$1, the first coolant supply passage 30$a$1, the fuel gas supply passage 32$a$, the second coolant supply passage 30$a$2, and the second oxygen-containing gas discharge passage 28$b$2 are arranged from upper to lower positions in this order.

That is, the first fuel gas discharge passage 32$b$1 is provided at an upper position of one end of the end plate 26$b$ in the longitudinal direction. The second fuel gas discharge passage 32$b$2 is provided at a lower position of the end plate 26$b$ in the longitudinal direction. The second fuel gas discharge passage 32$b$2 is positioned below the first fuel gas discharge passage 32$b$1. The fuel gas supply passage 32$a$ is provided at substantially the center in the vertical direction at the other end of the end plate 26$b$ in the longitudinal direction. The fuel gas supply passage 32$a$ is positioned above the second fuel gas discharge passage 32$b$2, and positioned below the first fuel gas discharge passage 32$b$1.

In the illustrated embodiment, each of the oxygen-containing gas supply passage 28$a$, the first oxygen-containing gas discharge passage 28$b$1, the second oxygen-containing gas discharge passage 28$b$2, the first coolant supply passage 30$a$1, the second coolant supply passage 30$a$2, the first coolant discharge passage 30$b$1, the second coolant discharge passage 30$b$2, the fuel gas supply passage 32$a$, the first fuel gas discharge passage 32$b$1, and the second fuel gas discharge passage 32$b$2 has a quadrangular shape in a plan view, alternatively, these passages may have a circular shape or a polygonal shape (other than the quadrangular shape) in a plan view.

The number, the size, and the position of the oxygen-containing gas supply passage 28$a$, the first oxygen-containing gas discharge passage 28$b$1, the second oxygen-containing gas discharge passage 28$b$2, the first coolant supply passage 30$a$1, the second coolant supply passage 30$a$2, the first coolant discharge passage 30$b$1, the second coolant discharge passage 30$b$2, the fuel gas supply passage 32$a$, the first fuel gas discharge passage 32$b$1, and the second fuel gas discharge passage 32$b$2 can be changed arbitrarily. In the fuel cell system 10, one of the first fuel gas discharge passage 32$b$1 and the second fuel gas discharge passage 32$b$2 may be dispensed with.

As shown in FIGS. 1 and 2, the power generation cell 18 includes a resin frame equipped membrane electrode assembly (hereinafter referred to as the "resin frame equipped MEA 34"), and a first separator 36 and a second separator 38 sandwiching the resin frame equipped MEA 34. Each of the first separator 36 and the second separator 38 is formed by press forming of, e.g., a steel plate, a stainless steel plate, an aluminum plate, a plated steel plate, or a metal thin plate having an anti-corrosive surface by surface treatment to have a corrugated shape in cross section and a wavy shape on the surface. Outer peripheries of the first separator 36 and the second separator 38 that are adjacent to each other are joined together by welding, brazing, crimping, etc.

The resin frame equipped MEA 34 includes a membrane electrode assembly (hereinafter referred to as the "MEA 40"), and a resin frame member 42 joined to an outer peripheral portion of the MEA 40 all around (see FIG. 2). The MEA 40 includes an electrolyte membrane 44, an anode 46 provided on one surface 44$a$ of the electrolyte membrane 44, and a cathode 48 provided on the other surface 44$b$ of the electrolyte membrane 44.

For example, the electrolyte membrane 44 is a solid polymer electrolyte membrane (cation exchange membrane). For example, the sold polymer electrolyte membrane is a thin membrane of perfluorosulfonic acid containing water. The electrolyte membrane 44 is interposed between the anode 46 and the cathode 48. A fluorine based electrolyte may be used as the electrolyte membrane 44. Alternatively, an HC (hydrocarbon) based electrolyte may be used as the electrolyte membrane 44.

The power generation cell 18 may be formed by adopting the electrolyte membrane 44 which protrudes outward instead of using the resin frame member 42. Further, frame shaped films may be provided on both sides of the electrolyte membrane 44 which protrudes outward.

In FIG. 2, the first separator 36 has an oxygen-containing gas flow field 50 on its surface 36$a$ facing the resin frame equipped MEA 34, for allowing the oxygen-containing gas to flow along an electrode surface in the direction indicated by the arrow B (horizontal direction).

One end of the oxygen-containing gas flow field 50 in the direction indicated by the arrow B is connected to (in fluid communication with) the oxygen-containing gas supply passage 28a, and the other end of the oxygen-containing gas flow field 50 in the direction indicated by the arrow B is connected to (in fluid communication with) the first oxygen-containing gas discharge passage 28b1 and the second oxygen-containing gas discharge passage 28b2.

The second separator 38 has a fuel gas flow field 52 on its surface 38a facing the resin frame equipped MEA 34, for allowing the fuel gas to flow along an electrode surface in the direction indicated by the arrow B (horizontal direction). One end of the fuel gas flow field 52 in the direction indicated by the arrow B is connected to (in fluid communication with) the first fuel gas discharge passage 32b1 and the second fuel gas discharge passage 32b2, and the other end of the fuel gas flow field 52 in the direction indicated by the arrow B is connected to (in fluid communication with) the fuel gas supply passage 32a.

A coolant flow field 54 is formed between a surface 36b of the first separator 36 and a surface 38b of the second separator 38 that are joined together by welding or brazing. The coolant flow field 54 is connected to (in fluid communication with the first coolant supply passage 30a1 and the second coolant supply passage 30a2, and the first coolant discharge passage 30b1 and the second coolant discharge passage 30b2. The coolant flow field 54 is formed between the back surface of the oxygen-containing gas flow field 50 of the first separator 36 and the back surface of the fuel gas flow field 52 of the second separator 38 when the first separator 36 and the second separator 38 are stacked one another.

As shown in FIG. 1, the fuel gas supply apparatus 14 includes a fuel gas supply channel 60, an injector device 62, an inlet pipe 64, and a transfer device 66. A fuel gas in a fuel gas tank (not shown) is supplied to the injector device 62 through the fuel gas supply channel 60.

As shown in FIG. 3, the injector device 62 includes a plurality of (two, in an example of FIG. 3) injectors 68 which inject the fuel gas supplied from the fuel gas supply channel 60 into the inlet pipe 64. The injector device 62 is positioned above the fuel gas supply passage 32a of the end plate 26b. The injector device 62 is fixed to the end plate 26b through a support member (not shown).

The two injectors 68 are provided in parallel to each other. The number, the shape, the size, etc. of the injectors 68 can be changed as necessary depending on the flow rate, etc. of the fuel gas supplied to the fuel cell stack 12. Each of the injectors 68 is provided in a manner that the axial line Ax of the injector 68 is inclined from the horizontal line by a predetermined inclination angle θ1. Preferably, the inclination angle θ1 is not less than 40°, and less than 90° (40°≤θ1<90°).

The inlet pipe 64 guides the fuel gas injected (discharged) from the injectors 68 into the fuel gas supply passage 32a (fuel cell stack 12). The gas liquid separator 16 is directly coupled to the lower side (lower portion) of the inlet pipe 64. An opening 72 is formed in a lower portion 70 of the surface of a channel 64a in the inlet pipe 64, positioned below the central line CL of the channel 64a. The opening 72 connects the channel 64a in the inlet pipe 64 and the inside of the gas liquid separator 16.

The inlet pipe 64 extends obliquely downward, from the injector device 62 toward the other end of the end plate 26b in the direction indicated by the arrow B2. Stated otherwise, the central line CL of the channel 64a in the inlet pipe 64 is inclined downward toward the downstream side. That is, the lower portion 70 in the inner surface of the inlet pipe 64 is inclined downward toward the downstream side. That is, in the inner surface of the inlet pipe 64, the lower portion 70 upstream of the opening 72 is inclined downward toward the downstream side thereof. In the structure, water on the upstream side of the opening 72 in the inlet pipe 64 can flow along the lower portion 70 by gravitation, to the opening 72, and the water can be discharged from the opening 72 into the gas liquid separator 16.

Preferably, the inclination angle θ2 of the lower portion 70 in the inner surface of the inlet pipe 64 to the horizontal line is not less than the maximum inclination angle of the vehicle, e.g., not less than 40°. In this case, it is possible to efficiently guide the water on the upstream side of the opening 72 in the inlet pipe 64, toward the opening 72. It should be noted that the inclination angle θ2 can be determined arbitrarily. A passage 74 connected to the fuel gas supply passage 32a is formed in an extended end of the inlet pipe 64.

As shown in FIGS. 1 and 3, the transfer device 66 transfers the fuel exhaust gas in the gas liquid separator 16 to the inlet pipe 64. The transfer device 66 includes an ejector 76 disposed in the channel 64a in the inlet pipe 64, for sucking the fuel exhaust gas in the gas liquid separator 16 into the inlet pipe 64, by negative pressure. The ejector 76 is positioned on the downstream side of the opening 72 in the channel 64a of the inlet pipe 64.

The transfer device 66 may include a pump instead of the ejector 76, for guiding the fuel exhaust gas in the gas liquid separator 16 into the channel 64a in the inlet pipe 64. Alternatively, the transfer device 66 may include both of the pump and the ejector 76.

The gas liquid separator 16 is directly coupled to a lower portion of the inlet pipe 64, and fixed to an end surface of the end plate 26b by a fastening member (not shown) such as a screw member. The gas liquid separator 16 extends with inclination from the inlet pipe 64 downward toward one end (in the direction indicated by the arrow B1) of the end plate 26b. The gas liquid separator 16 includes a base part 80 including a gas liquid separator main body 84 (gas liquid separation chamber) and a coupling part 82 provided above the base part 80.

The base part 80 includes the gas liquid separator main body 84 and a cover 86 containing the gas liquid separator main body 84. The gas liquid separator main body 84 performs gas liquid separation of the fuel exhaust gas discharged from the fuel cell stack 12. The cover 86 is provided in a manner to cover the first fuel gas discharge passage 32b1 and the second fuel gas discharge passage 32b2. A first inlet port 88 and a second inlet port 90 are formed in the cover 86. The fuel exhaust gas discharged from the fuel cell stack 12 is guided into the base part 80 through the first inlet port 88 and the second inlet port 90.

The first inlet port 88 is formed in the cover 86, at a position facing the first fuel gas discharge passage 32b1. Stated otherwise, the first inlet port 88 is directly connected to the first fuel gas discharge passage 32b1. The fuel exhaust gas discharged from the first fuel gas discharge passage 32b1 is guided into the base part 80 (into the gas liquid separator main body 84) through the first inlet port 88.

The second inlet port 90 is formed in the cover 86, at a position facing the second fuel gas discharge passage 32b2. Stated otherwise, the second inlet port 90 is directly connected to the second fuel gas discharge passage 32b2. The second exhaust gas discharged from the second fuel gas discharge passage 32b2 is guided into the base part 80 (into the gas liquid separator main body 84) through the second inlet port 90.

The lower portion of the cover 86 has such a shape that water separated from the fuel exhaust gas in the gas liquid separator main body 84 can be retained. The lower portion of the cover 86 has a width in the direction indicated by the arrow B that is narrowed toward the lower side. A drain part 92 is provided in the lower portion of the cover 86, for discharging water in the gas liquid separator 16.

The drain part 92 includes a drain channel 94 provided at the lowermost position of the cover 86, and a drain valve 96 for opening and closing the drain channel 94. A guide wall 98 is provided in the cover 86, for guiding water from the coupling part 82 into the cover 86 toward the drain part 92. The guide wall 98 is inclined downward and extended straight toward one end of the end plate 26b (in the direction indicated by the arrow B1) from the coupling part 82 to the drain part 92.

The coupling part 82 extends upward from the cover 86 in a quadrangular cylindrical shape. The coupling part 82 may be formed in a circular cylindrical shape or a polygonal cylindrical shape (other than the quadrangular cylindrical shape). As shown in FIG. 3, the coupling part 82 is coupled to an attachment part 100 provided integrally with the lower part of the inlet pipe 64, by a plurality of fastening members (not shown) such as screw members. The attachment part 100 extends in a flat plate shape extending in a horizontal direction.

In FIG. 3, a quadrangularly ringed ridge 102 protruding downward, and the above described opening 72 positioned inside the ridge 102 are formed in a lower surface 100a of the attachment part 100. An extended end of the coupling part 82 is externally fitted to the ridge 102. That is, the opening 72 of the inlet pipe 64 and an inner hole 82a of the coupling part 82 are connected to each other to form a connection channel 104. Specifically, the connection channel 104 connecting the inside of the gas liquid separator 16 and the channel 64a in the inlet pipe 64 is formed in a part coupling the gas liquid separator 16 and the inlet pipe 64.

A ringed seal member 106 is provided in an extended end surface of the coupling part 82 for sealing a position between the extended end surface of the coupling part 82 and the lower surface 100a of the attachment part 100 in an air tight and liquid tight manner. A valve member 110 is provided on a protruding end surface of the ridge 102 through a ringed seal member 108. Stated otherwise, the valve member 110 is provided in the inner hole 82a (connection channel 104) of the coupling part 82.

Figure 4A:
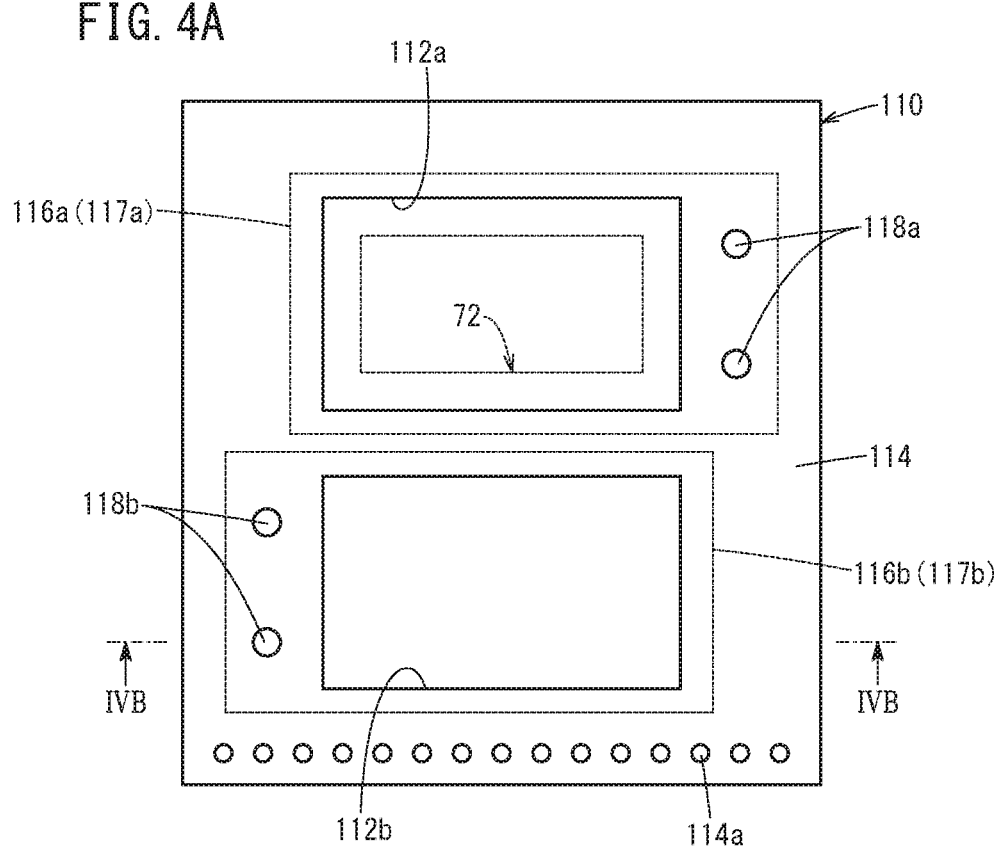
FIG. 4A is an arrow view taken along a line IVA in FIG. 3.
Figure 4B:
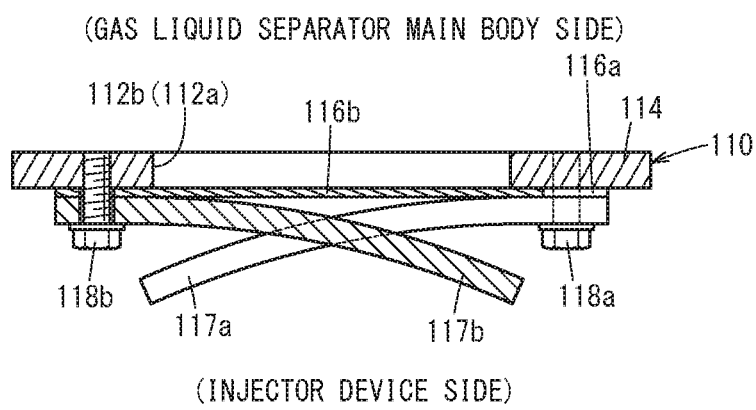
FIG. 4B is a cross sectional view taken along a line IVB in FIG. 4A.

As shown in FIGS. 3 to 4B, the valve member 110 permits the fuel exhaust gas to flow from the inside of the gas liquid separator 16 into the inlet pipe 64, and restricts the fuel gas to flow from the inside of the inlet pipe 64 into the gas liquid separator 16. The valve member 110 extends in a direction perpendicular to the direction in which the coupling part 82 extends (see FIG. 3). The valve member 110 includes a plate shaped support part 114 fixed to the seal member 108 (see FIG. 3) and having two openings 112a, 112b, two valve elements 116a, 116b provided for the support part 114 in a manner to cover these openings 112a, 112b, and two stoppers 117a, 117b for defining the upper movement limit of these valve elements 116a, 116b.

In FIG. 3, the support part 114 is fixed to the seal member 108. The support part 114 is inclined downward in the direction indicated by the arrow B2. As shown in FIGS. 3 and 4A, a water releasing hole 114a is formed in a marginal portion of the support part 114 in the direction indicated by the arrow B2, for allowing water retained on an upper surface of the support part 114 to flow into the base part 80 of the gas liquid separator 16. Each of the openings 112a, 112b has a rectangular shape. The two openings 112a, 112b are arranged in a direction in which the inlet pipe 64 extends.

As shown in FIGS. 4A and 4B, each of the valve elements 116a, 116b is an elastically deformable rectangular (band shaped) plate member. Examples of materials of the valve elements 116a, 116b include metal materials such as stainless steel. The valve element 116a is provided for the support part 114 in a manner to cover the opening 112a from above (from the side where the injector device 62 and the attachment part 100 are positioned). The valve element 116b is provided for the support part 114 in a manner to cover the opening 112b from above.

Each of the stoppers 117a, 117b is a plate member which is thicker than the valve elements 116a, 116b. Examples of the stoppers 117a, 117b include the same material as those used for the valve elements 116a, 116b. The stopper 117a covers the valve element 116a from above (the side where the injector device 62 and the attachment part 100 are positioned). The stopper 117b covers the valve element 116b from above.

One end of the valve element 116a and one end of the stopper 117a are overlapped with each other, and in this state, fastened to the support part 114 by a fastening member 118a such as a screw member. The stopper 117a is bent away from the support part 114 from its intermediate portion in the longitudinal direction toward an end opposite to the fastening member 118a. The valve element 116a faces the opening 72.

The valve element 116b and the stopper 117b have the same structure as the valve element 116a and the stopper 117a, and thus, the detailed description about the structure of the valve element 116b and the stopper 117b is omitted. The valve element 116b and the stopper 117b are provided in 180° opposite to the valve element 116a and the stopper 117a. The end of the valve element 116b opposite to the side where the fastening member 118a is positioned and the end of the stopper 117b opposite to the side where the fastening member 118a is positioned are overlapped with each other, and in this state, fastened to the support part 114 by a fastening member 118b such as a screw member.

Figure 5:
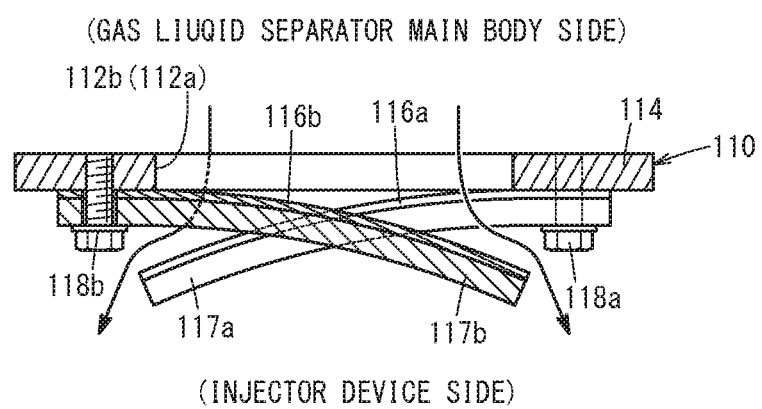
FIG. 5 is a view showing operation of a valve member.

In the valve member 110 as described above, as shown in FIG. 5, each of the valve elements 116a, 116b is bent, deformed elastically toward the injector device 62 by the fuel exhaust gas guided from the gas liquid separator main body 84. As a result, the valve member 110 is placed into the open state, and the fuel exhaust gas in the gas liquid separator main body 84 is guided into the injector device 62 through the openings 112a, 112b.

In this regard, the elastic deformation (upper movement limit) of each of the valve elements 116a, 116b is restricted by the stopper 117a, 117b. Therefore, the valve elements 116a, 116b are not deformed excessively under pressure of the fuel exhaust gas. It should be noted that, in the case where the pressure in the gas liquid separator main body 84 is relatively low, the valve element 116a, 116b are not deformed elastically, and close the openings 112a, 112b. As a result, the valve member 110 is placed in the closed state, and it is possible to prevent the fuel gas discharged from the injector 68 from being guided into the gas liquid separator main body 84.

The size, the shape, the position, and the number of each of the opening 72 of the inlet pipe 64 and the openings 112a, 112b of the valve member 110 can be changed as necessary depending on the flow rate, etc. of the fuel exhaust gas.

Next, operation of the fuel cell system 10 having the above structure will be described.

As shown in FIG. 2, the oxygen-containing gas is supplied to the oxygen-containing gas supply passage 28*a*, and guided from the oxygen-containing gas supply passage 28*a* into the oxygen-containing gas flow field 50 of the first separator 36. Then, the oxygen-containing gas moves along the oxygen-containing gas flow field 50 in the direction indicated by the arrow B, and the oxygen-containing gas is supplied to the cathode 48 of the MEA 40.

In the meanwhile, as shown in FIG. 1, the fuel gas is supplied from a fuel gas tank (not shown) to the injector device 62 through the fuel gas supply channel 60. In FIGS. 2 and 3, the fuel gas injected from the injector device 62 into the inlet pipe 64 is guided into the fuel gas supply passage 32*a* through the ejector 76, and guided into the fuel gas flow field 52 of the second separator 38. Then, the fuel gas moves along the fuel gas flow field 52 in the direction indicated by the arrow B, and the fuel gas is supplied to the anode 46 of the MEA 40.

Thus, in each of the MEAs 40, the oxygen-containing gas supplied to the cathode 48 and the fuel gas supplied to the anode 46 are consumed in electrochemical reactions to perform power generation.

Then, as shown in FIG. 2, the oxygen-containing gas is supplied to the cathode 48 and consumed at the cathode 48, and the remaining of the oxygen-containing gas flows from the oxygen-containing gas flow field 50 into the first oxygen-containing gas discharge passage 28*b*1 and the second oxygen-containing gas discharge passage 28*b*2. The oxygen-containing gas is discharged in the direction indicated by the arrow A. Likewise, the fuel gas is supplied to the anode 46 and consumed at the anode 46, and the remaining of the fuel gas (fuel exhaust gas) flows from the fuel gas flow field 52 into the first fuel gas discharge passage 32*b*1 and the second fuel gas discharge passage 32*b*2. The fuel gas is discharged in the direction indicated by the arrow A.

As shown in FIGS. 1 and 3, the fuel exhaust gas discharged from the first fuel gas discharge passage 32*b*1 is directly guided from the first inlet port 88 of the gas liquid separator 16 into the cover 86. The fuel exhaust gas discharged from the second fuel gas discharge passage 32*b*2 is directly guided from the second inlet port 90 of the gas liquid separator 16 into the cover 86.

The fuel exhaust gas containing water is guided into the cover 86 and subjected to gas liquid separation in the gas liquid separator main body 84. After the water is removed from the fuel exhaust gas in the gas liquid separator main body 84, the fuel exhaust gas is sucked into the channel 64*a* of the inlet pipe 64 through the connection channel 104 and the valve member 110 by operation of the negative pressure of the ejector 76. That is, after gas liquid separation of the fuel exhaust gas is performed by the gas liquid separator main body 84, the fuel exhaust gas is merged with the fuel gas injected from the injector device 62 into the inlet pipe 64, and used for power generation. In the meanwhile, liquid water removed by the gas liquid separator main body 84 is retained in the lower portion of the cover 86.

Further, in FIG. 2, after the coolant supplied to the first coolant supply passage 30*a*1 and the second coolant supply passage 30*a*2 is guided into the coolant flow field 54 formed between the first separator 36 and the second separator 38 that are joined together, the coolant flows in the direction indicated by the arrow B. After the coolant cools the MEA 40, the coolant is discharged from the first coolant discharge passage 30*b*1 and the second coolant discharge passage 30*b*2.

In this case, the fuel cell system 10 according to the embodiment of the present invention offers the following advantages.

The gas liquid separator 16 is directly coupled to the lower portion of the inlet pipe 64, and the connection channel 104 configured to connect the inside of the gas liquid separator 16 and the channel 64*a* of the inlet pipe 64 together is formed in a part coupling the gas liquid separator 16 and the inlet pipe 64 together.

In the structure, since the gas liquid separator 16 is directly coupled to the lower portion of the inlet pipe 64, any circulation pipe connecting the gas liquid separator 16 and the inlet pipe 64 becomes unnecessary. Therefore, it is possible to reduce the number of component parts, and achieve size reduction.

The fuel cell system 10 includes the transfer device 66 configured to transfer the fuel exhaust gas discharged from the gas liquid separator 16 into the channel 64*a* in the inlet pipe 64. The lower portion 70 of the inner surface forming the channel 64*a* in the inlet pipe 64, positioned below the central line CL of the channel 64*a* is inclined downward toward the downstream side of the inlet pipe 64.

In the structure, the water in the channel 64*a* in the inlet pipe 64 (condensed water and water guided from the gas liquid separator 16 together with the fuel exhaust gas) can be guided along the lower portion 70 into the connection channel 104, and dropped into the gas liquid separator 16. Therefore, it is possible to suppress entry of the water from the inlet pipe 64 into the fuel cell stack 12.

The transfer device 66 includes the ejector 76 disposed in the inlet pipe 64, and configured to suck the fuel exhaust gas in the gas liquid separator 16 to the channel 64*a* in the inlet pipe 64, by negative pressure, and the connection channel 104 makes a fluid communication between the ejector 76 in the channel 64*a* in the inlet pipe 64 and the injector 68.

In the structure, since the transfer device 66 includes the ejector 76, it is possible to simplify the structure of the fuel cell system 10.

The drain part 92 configured to discharge water in the gas liquid separator 16 is mounted on a lower part of the gas liquid separator 16. The guide wall 98 configured to guide water which has flowed from the connection channel 104 into the gas liquid separator 16 into the drain part 92 is provided in the gas liquid separator 16.

In the structure, it is possible to reliably discharge the water guided from the connection channel 104 into the gas liquid separator 16 by the drain part 92.

The valve member 110 is provided in the connection channel 104. The valve member 110 is configured to permit inflow of the fuel exhaust gas from the gas liquid separator 16 into the channel 64*a* in the inlet pipe 64, and limit outflow of the fuel gas from the channel 64*a* in the inlet pipe 64 into the gas liquid separator 16.

In the structure, while guiding the fuel exhaust gas to the channel 64*a* in the inlet pipe 64 from the gas liquid separator 16, it is possible to suppress leakage of the fuel gas flowing through the channel 64*a* in the inlet pipe 64 into the gas liquid separator 16 through the connection channel 104.

The gas liquid separator 16 is provided at an end surface of the fuel cell stack 12 in the stacking direction of the plurality of power generation cells 18.

In the structure, the distance between the gas liquid separator 16 and the fuel cell stack 12 is reduced. Accordingly, it is possible to achieve size reduction of the fuel cell system 10.

The fuel cell stack 12 includes the fuel gas supply passage 32*a* configured to guide the fuel gas to each of the plurality of power generation cells 18, and the first fuel gas discharge passage 32*b*1 and the second fuel gas discharge passage 32*b*2 configured to discharge the fuel exhaust gas discharged from each of the plurality of power generation cells 18. The gas liquid separator 16 includes the first inlet port 88 configured to guide the fuel exhaust gas discharged from the first fuel gas discharge passage 32*b*1 into the gas liquid separator 16, and the second inlet port 90 configured to guide the fuel exhaust gas discharged from the second fuel gas discharge passage 32*b*2 into the gas liquid separator 16.

In the structure, it is possible to guide the fuel exhaust gas from the fuel cell stack 12 into the gas liquid separator 16.

The first inlet port 88 is provided at a position of the gas liquid separator 16 facing the first fuel gas discharge passage 32*b*1, and the second inlet port 90 is provided at a position of the gas liquid separator 16 facing the second fuel gas discharge passage 32*b*2.

In the structure, it is possible to directly guide the fuel exhaust gas discharged from the first fuel gas discharge passage 32*b*1 into the first inlet port 88, and directly guide the fuel exhaust discharged from the second fuel gas discharge passage 32*b*2 into the second inlet port 90. Accordingly, it is possible to achieve reduction of the number of component parts of the fuel cell system 10, and achieve size reduction of the fuel cell system 10.

The gas liquid separator 16 is mounted in the fuel cell system 10 in which a fuel gas injected from the injectors 68 to the channel 64*a* in the inlet pipe 64 is guided to the fuel cell stack 12. The gas liquid separator 16 is configured to perform gas liquid separation of the fuel gas discharged from the fuel cell stack 12. The fuel cell stack 12 includes the fuel gas supply passage 32*a* configured to guide the fuel gas to each of a plurality of power generation cells 18 that are stacked together, and the first fuel gas discharge passage 32*b*1 and the second fuel gas discharge passage 32*b*2 configured to discharge a fuel exhaust gas discharged from the plurality of power generation cells 18, respectively.

The gas liquid separator 16 includes the base part 80 having the gas liquid separator main body 84 (gas liquid separation chamber) and the coupling part 82 provided above the base part 80, and directly coupled to the lower portion of the inlet pipe 64. The base part 80 includes the first inlet port 88 configured to guide the fuel exhaust gas discharged from the first fuel gas discharge passage 32*b*1 into the base part 80, and the second inlet port 90 configured to guide the fuel exhaust gas discharged from the second fuel gas discharge passage 32*b*2 into the base part 80.

The gas liquid separator 16 offers the same advantages as in the case of the above described fuel cell system 10.

The present invention is not limited to the above described structure. The first inlet port 88 may be provided at a position of the gas liquid separator 16 which does not face the first fuel gas discharge passage 32*b*1. In this case, an intermediate pipe connecting the first fuel gas discharge passage 32*b*1 and the first inlet port 88 together is provided in the gas liquid separator 16. By providing the intermediate pipe in this manner, it is possible to increase the size of the gas liquid separator 16.

The fuel cell system and the gas liquid separator according to the present invention are not limited to the above described embodiment. It is a matter of course that various structures can be adopted without departing from the gist of the present invention.

What is claimed is:

1. A fuel cell system comprising:
    an inlet pipe configured to guide a fuel gas injected from an injector to a fuel cell stack;
    a gas liquid separator configured to perform gas liquid separation of a fuel exhaust gas discharged from the fuel cell stack, wherein the gas liquid separator is directly coupled to a lower portion of the inlet pipe;
    a connection channel connecting together an interior of the gas liquid separator and a channel in the inlet pipe, the connection channel provided in a part coupling together the gas liquid separator and the inlet pipe;
    a transfer device configured to transfer a fuel exhaust gas derived from the gas liquid separator to the channel in the inlet pipe; and
    a lower portion of an inner surface forming the channel in the inlet pipe, and positioned below a central line of the channel in the inlet pipe, is inclined downward toward a downstream side of the inlet pipe.

2. The fuel cell system according to claim 1, wherein the transfer device comprises an ejector disposed in the inlet pipe, and configured to suck the fuel exhaust gas in the gas liquid separator into the channel in the inlet pipe, by negative pressure; and
    the connection channel makes a fluid communication between the ejector in the channel in the inlet pipe and the injector.

3. The fuel cell system according to claim 1, wherein a drain part configured to discharge water in the gas liquid separator is provided at a lower part of the gas liquid separator; and
    a guide wall configured to guide water which has flowed from the connection channel into the drain part is provided in the gas liquid separator.

4. The fuel cell system according to claim 2, wherein a valve member is provided in the connection channel, the valve member being configured to permit inflow of the fuel exhaust gas from the gas liquid separator into the channel in the inlet pipe, and limit outflow of the fuel gas from the channel in the inlet pipe into the gas liquid separator.

5. The fuel cell system according to claim 2, wherein the gas liquid separator is mounted on the fuel cell stack at its end surface in a stacking direction of a plurality of power generation cells.

6. The fuel cell system according to claim 5, wherein the fuel cell stack comprises:
    a fuel gas supply passage configured to guide the fuel gas to each of the plurality of power generation cells; and
    a first fuel gas discharge passage and a second fuel gas discharge passage configured to discharge the fuel exhaust gas discharged from each of the plurality of power generation cells,
    and wherein the gas liquid separator includes:
    a first inlet port configured to guide the fuel exhaust gas discharged from the first fuel gas discharge passage into the gas liquid separator; and
    a second inlet port configured to guide the fuel exhaust gas discharged from the second fuel gas discharge passage into the gas liquid separator.

7. The fuel cell system according to claim 6, wherein the first inlet port is provided at a position of the gas liquid separator facing the first fuel gas discharge passage; and
    the second inlet port is provided at a position of the gas liquid separator facing the second fuel gas discharge passage.

8. The fuel cell system according to claim 1, wherein the central line of the channel in the inlet pipe is inclined downward toward the downstream side of the inlet pipe.

9. A gas liquid separator mounted on a fuel cell system in which a fuel gas injected from an injector to a channel in an inlet pipe is guided to a fuel cell stack, the gas liquid separator being configured to perform gas liquid separation of the fuel exhaust gas discharged from the fuel cell stack,
   wherein the fuel cell stack includes a fuel gas supply passage configured to guide the fuel gas to each of a plurality of power generation cells that are stacked together, and a first fuel gas discharge passage and a second fuel gas discharge passage configured to discharge a fuel exhaust gas discharged from the plurality of power generation cells, respectively;
the gas liquid separator comprises:
a base part having a gas liquid separation chamber; and
a coupling part provided above the base part, and directly coupled to a lower portion of the inlet pipe,
the base part comprises:
a first inlet port configured to guide the fuel exhaust gas discharged from the first fuel gas discharge passage into the base part; and
a second inlet port configured to guide the fuel exhaust gas discharged from the second fuel gas discharge passage into the base part.

* * * * *

UNITED STATES PATENT AND TRADEMARK OFFICE
CERTIFICATE OF CORRECTION

| | |
|---|---|
| PATENT NO. | : 11,495,811 B2 |
| APPLICATION NO. | : 16/794292 |
| DATED | : November 8, 2022 |
| INVENTOR(S) | : Yoshitomi |

It is certified that error appears in the above-identified patent and that said Letters Patent is hereby corrected as shown below:

In the Claims

At Line 31, in Column 12, in Claim 4:
It should read "The fuel cell system according to claim 1,"...

At Line 37, in Column 12, in Claim 5:
It should read "The fuel cell system according to claim 1,"...

Signed and Sealed this
Twenty-fifth Day of April, 2023

*Katherine Kelly Vidal*

Katherine Kelly Vidal
*Director of the United States Patent and Trademark Office*